(12) United States Patent
Quacchia

(10) Patent No.: US 6,307,980 B1
(45) Date of Patent: Oct. 23, 2001

(54) METHOD AND APPARATUS FOR INTRODUCING REFERENCE IMPAIRMENTS INTO VIDEO SIGNALS

(75) Inventor: Marco Quacchia, Turin (IT)

(73) Assignee: Cselt-Centro Studi e Laboratori Telecomunicazioni S.p.A., Turin (IT)

( * ) Notice: Subject to any disclaimer, the term of this patent is extended or adjusted under 35 U.S.C. 154(b) by 0 days.

(21) Appl. No.: 09/199,145

(22) Filed: Nov. 24, 1998

(30) Foreign Application Priority Data

Dec. 16, 1997 (IT) .............................................. TO97A1093

(51) Int. Cl.$^7$ ....................................................... G06K 9/40
(52) U.S. Cl. .......................... 382/268; 382/236; 348/700; 348/701
(58) Field of Search ..................................... 382/236, 266, 382/268, 269, 275, 107; 348/607, 608, 620, 700, 701

(56) References Cited

U.S. PATENT DOCUMENTS 5,367,343 * 11/1994 Blair ..................................... 348/700
5,701,163 * 12/1997 Richards et al. ..................... 348/578
6,005,638 * 12/1999 Blair et al. ............................ 348/607
6,181,828 * 1/2001 Hogan .................................. 382/254

OTHER PUBLICATIONS

XP–000721388 —A Generalized Block–Edge Impairment Metric for Video Coding, pp. 317–320, vol. 4, No. 11, Nov. 1997.

* cited by examiner

*Primary Examiner*—Thomas D. Lee
(74) *Attorney, Agent, or Firm*—Herbert Dubno

(57) ABSTRACT

A method and an apparatus are provided for introducing reference impairments into pictures to be used in subjective tests on digital video signals, in compliance with ITU-T Recommendation P.930. The method generates blockiness distortion and/or edge busyness distortion. For the first distortion, areas close to picture edges are selected and, through a movement characteristics analysis, blocks are identified that belong to said areas and that are concerned only by the actual movement of the subject and, for blocks chosen among the identified ones, the luminance value is replaced by a value linked to the individual pixel luminance and to the average block luminance value. For the second distortion, echoes are applied that are randomly chosen in a prearranged set and that alternate at random.

15 Claims, 5 Drawing Sheets

METHOD AND APPARATUS FOR INTRODUCING REFERENCE IMPAIRMENTS INTO VIDEO SIGNALS

Figure 1:
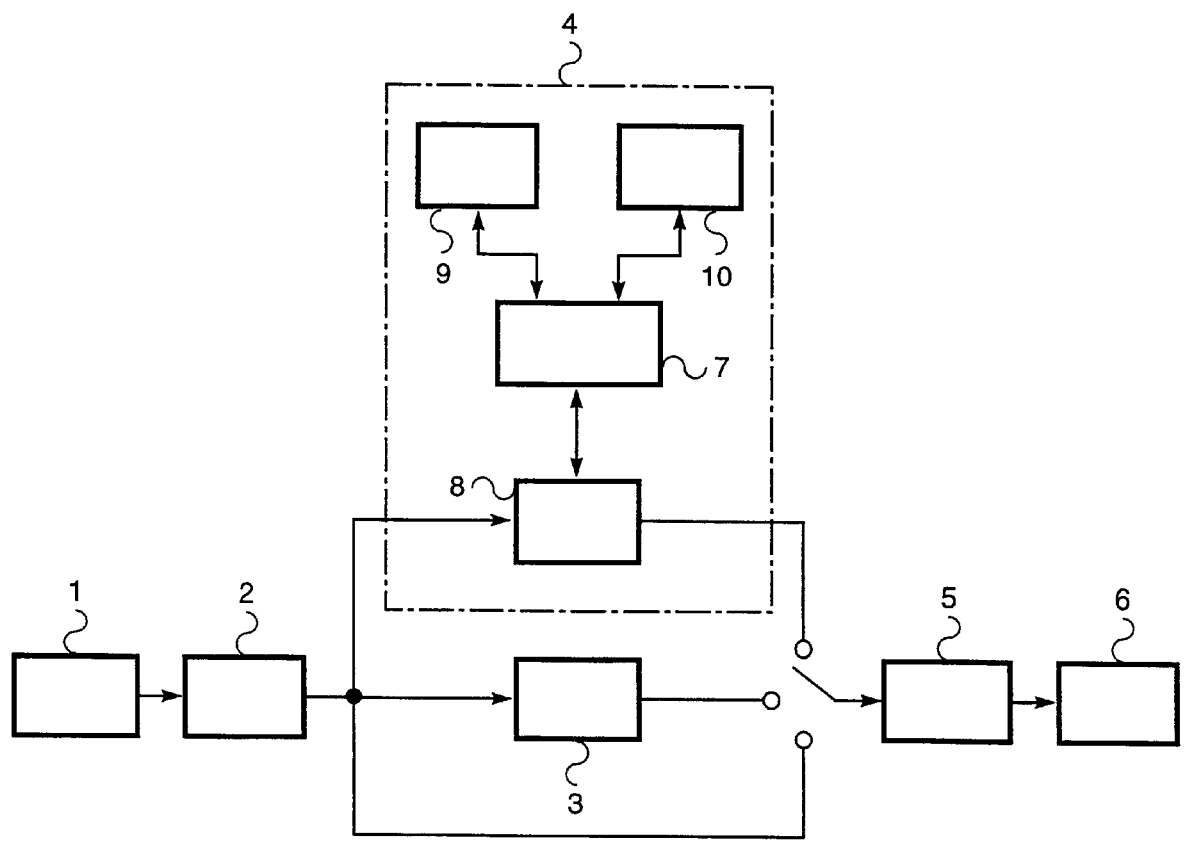

The present invention deals with digital video signal processing systems, and more particularly it deals with a method of and an apparatus for introducing reference impairments into pictures to be used in subjective tests on digital video signals.

In the field of digital video signal transmission, researches are constantly made for coding (or compression) algorithms that allow reducing as much as possible the amount of information to be transmitted while guaranteeing at the same time a good quality of the coded signal. Signal quality is generally evaluated through subjective tests, in which a comparison is made between the sequence of processed pictures and a reference sequence. In case of a reasonably high quality (simply as an example, in case of coding with bit rate in the compressed sequence of the order of some Mbit/s), the reference sequence is replaced by the original unprocessed sequence. In case of compression algorithms with very low bit rates (always as an example, bit rates of the order of some kbit/s), that bring about a greater quality reduction with respect to the original sequence, it is preferred to use, as reference pictures, pictures subjected to distortion instead of those of the original sequence, so that the reference sequence quality is not exceedingly different from that of the sequence to be evaluated.

In order to guarantee a repeatability of subjective tests in time and in different measuring centres, ITU-T Draft Recommendation P.930 "Principles of a Reference Impairment System for Video" states a set of impairments to be introduced—individually or jointly—into a sequence of pictures to generate a reference sequence. The above Recommendation catalogues the main types of distortion that are observed on a video signal subjected to digital processing, and provides a brief description of the origin of such distortions.

More in detail, the distortions being taken into account in the Recommendation are as follows:

Blockiness (or block distortion): it is caused by coarse quantization of the spatial frequency components during the coding process and it is generally more visible in the smoothest picture areas located next to moving edges;

Blurring: it is the reduction in sharpness of edges and in spatial detail caused by the need of a trade off, in compression algorithms, between number of usable bits on the one hand and resolution provided by code and motion representation on the other hand;

Edge Busyness (echoes or pixel replicas with time-varying positions and intensities): it is a distortion that is concentrated at object edges, and it is caused by the use of relatively coarse quantization levels when coding a block that includes both edges delimiting rather smooth areas and pixels with a quite different average luminance level;

Noise around moving edges (known as Mosquito noise): it is a noise substantially similar to the previous one, characterised by added moving artefacts or by blotchy patterns superimposed over the edges;

"Pepper and salt" effect or quantization noise: it is a typical noise of the digital conversion processes and its appearance is similar to the well-known "snow effect" of the analogue television, though it is distributed over the picture in a non-uniform way;

Jerkiness: as its name states, it consists of the perception of an originally smooth movement as a series of snapshots.

An Appendix to the Recommendation also discloses the way of simulating the above distortions as regards luminance, and includes a proposal to implement a system to generate them. This known system operates as follows:

blockiness: it is obtained by identifying picture edges, to recognise areas where such distortion is more commonly visible; in these areas, a certain number of blocks of N×N pixels where the distortion must be introduced are selected, through an analysis of the displacement characteristics with respect to the previous frame; to actually introduce the distortion, the pixel luminance value in each selected block is then replaced by a new value obtained by adding a random value ranging between −2 and +2 to the average between the original pixel luminance and the average block luminance; every block keeps this distortion for a fixed number of frames (for example 15) to make this effect more easily perceivable;

blurring: it is implemented by applying, frame by frame, a low-pass unidimensional digital filtering on each frame line and by multiplying the filtered samples by a normalisation coefficient, in order to recover the correct amplitude dynamics;

edge busyness: it is implemented through a bidimensional filtering with filters having ripples in the passband amplitude response: the ripple amplitude determines the amplitude or intensity of the echoes that are added to simulate distortion, the ripple frequency determines the echo displacement with respect to the picture and the phase determines the echo polarity;

quantization noise: it is simulated by randomly choosing a pre-set number of pixels and by replacing the luminance value with a random value within a range of allowed values;

mosquito noise: it is simulated by adding a random value, chosen within pre-set a range, to the luminance value for each pixel classified as belonging to edges and having an associated motion;

jerkiness: it is simulated by repeating a same frame for a certain number of times.

The tests carried out have proven that the system proposed in the Appendix to the Recommendation is not fully satisfactory—that is, it does not allow an easy distortion recognition—at least as regards edge busyness and blockiness distortions.

According to the present invention, instead, a method and an apparatus are provided through which the above distortions are generated so that the perception thereof is made easier during the tests.

The features of the invention are disclosed in the following claims 1 to 12, as regards the method, and in claims 13 to 15, as regards the apparatus.

For a better understanding reference is made to the enclosed drawings, in which:

FIG. 1 is an overall block diagram of a system for carrying out subjective tests on video pictures, comprising a reference picture generating system operating according to the invention;

FIG. 2, divided into two parts designated as 2A and 2B, is a flow chart of the operations related to blockiness distortion introduction;

FIG. 3, divided into two parts designated as 3A and 3B, is a flow chart of the operations related to edge busyness distortion introduction.

With reference to FIG. 1, a system for carrying out subjective tests on digital picture processing apparatus includes a source 1 that generates a sequence of test pictures that are digitally converted in an analogue-to-digital converter 2 and are then applied both to a test apparatus 3, for example a digital coder-decoder, and to a reference picture generating system 4. The latter is adapted to introduce certain distortions into a picture that are generally chosen among those introduced by the processing. The outputs of blocks 3, 4 are applied to a digital-to-analogue converter 5 that supplies the sequences reconstructed to a monitor 6 for comparison by a viewer. Converters 2 and 5 can also be directly mutually connected so that it is possible to use the sequence issued by source 1 as a reference: this is possible if processing apparatus 3 supplies a processed picture whose quality is relatively high and comparable with the original picture quality. Should the system not be able to operate in real time, the images supplied by blocks 3, 4 can be collected by means of a recorder and reconverted afterwards into analogue form to be applied to the monitor.

As a principle, the reference picture generating system 4 can be schematised by a suitably programmed processing unit 7 (for example a conventional digital signal processor), associated on the one side with a first memory 8, in which one or more frames of the test sequence to be processed are temporarily stored and from which the processed frames are downloaded, and on the other side with a second memory 9 storing the necessary information (for example, digital filter coefficient files, echo files, operating parameters, etc.) in order the processing unit 7 can perform the processing required to introduce the different distortions. A console 10 connected to processing unit 7 will allow an operator to select a desired operating mode (for example individual introduction of one or more distortions or sequential application, in a pre-set order, of all admitted distortions), to set the operating parameters for the individual distortions, to keep track of the distortions introduced and of the values chosen for different parameters, etc.

This type of system can be used not only to create standard test execution conditions and standard distortion conditions, so as to allow comparing tests carried out in different times and in different laboratories, but also to quantify to a certain extent the test results in terms of introduced distortion degree: in fact the operator can successively introduce, on a standard sequence of test pictures, different distortions by modifying parameters for each one of them (this corresponds to the modification of the introduced distortion level) till a reference image is obtained whose quality, according to the viewer, corresponds to that of the picture produced by apparatus 3, and can record information related to test execution.

For better clarity, hereinbelow it is supposed that the distortions introduced by system 4 are indeed those described in ITU-T Recommendation P.930. In this case, the operations related to the application of blurring, quantization noise and mosquito noise distortions are substantially similar to those described in the Appendix to the Recommendation and briefly mentioned above. Generation of blockiness and edge busyness distortions, though complying with the principles stated in the Recommendation, is instead obtained in a manner that is the subject matter of the invention. The invention also improves jerkiness generation.

Blockiness distortion generation requires the following operations:

areas are identified where it is likely that distortions appear in the test sequence due to processing in apparatus 3 under test;

through an analysis of movement characteristics, a certain number of pixel blocks, to which distortion is to be applied, is selected within those areas;

distortion is actually applied by replacing the pixel luminance value for each selected block with a value computed by the algorithm.

For each selected block, distortion is applied for the current frame and for a number of following frames, thereby creating a persistence effect. In a preferred embodiment of the invention, the persistence period is relatively limited, for example less than 10 frames and more preferably between 1 and 5 frames.

More particularly, at each frame, the operations are as follows.

The first operation consists in dividing the frame into blocks of N×N pixels, where N is a parameter set by the operator through console 10. Then, before proceeding, all blocks to which distortion has been applied in previous frames and for which the persistence time is not elapsed yet are removed, since those blocks must not be further distorted in order not to make the persistence effect disappear.

Afterwards, areas where distortion must be introduced are identified. As stated above, this type of distortion generally appears in rather smooth areas located next to edges and affected by movement, and a first step is therefore identifying the edges. This operation in turn includes two subsequent steps. The first step consists in evaluating the edge location by applying the so-called horizontal and vertical Sobel filters to the whole picture and then in performing an average of the results. Sobel filters are algorithms approximating luminance derivative along horizontal and vertical directions and thereby they allow recognising areas, like picture edges, where luminance has a sudden variation with respect to adjacent areas. These algorithms are well known in the art. Further details can be found in the book "Digital image processing" by R. C. Gonzalez and R. E. Woods, Addison—Wesley Ed., pages 197–200 and 418–420. The result of such processing is then compared, in the second step, with an input threshold: pixels for which the processing result has given a value greater than this threshold are classified as belonging to edges. As a result of the edge detection algorithm, a frame is generated where the luminance value is forced to a certain pre-set value for pixels classified as edge pixels, to 0 for the other ones.

This procedure is the same as used for edge detection when applying quantization noise distortion, even if the threshold and the pre-set luminance value an be different.

Once having identified the edges, movement has to be recognised, by distinguishing however between subject movement and camera movement, so as to apply distortion only to blocks being affected by an actual subject movement. The number of blocks to which distortion has to be applied in a frame and the number of frames in which distortion has to be applied to the different blocks are further algorithm parameters, set by the operator. Before the actual movement identification, a first block selection is carried out, to remove those directly belonging to the picture edge and to take into account only blocks that are adjacent to edges or at a distance therefrom. For this purpose, the number Nb of pixels classified as edge pixels is computed for each block, and this number is compared with three threshold values k1, k2 and k3 (with k1>k2>k3), that are also three parameters to be set by the operator. The thresholds define an upper range (k2–k1) and a lower range (0–k3) of values. The blocks concerned are those for which Nb meets the condition k2<Nb≦k1 and those for which Nb meets the condition 0≦Nb 23 k3, that is blocks having a number of edge pixels falling within the upper range and those having a number of edge pixels falling within the lower range. It is immediate to see that comparison with the upper range of values allows identifying blocks next to edges and comparison with the lower threshold allows identifying blocks that are relatively far from the edges. Suitable values for the thresholds can be, in case of an 8×8 pixel block, 40 to 64 for k1, 4 to 20 for k2 and 0 to 3 for k3.

To identify movement in the remaining blocks, the change in the so-called temporal information with respect to the homologous block in the previous frame is computed. The temporal information, as known, is represented by the difference between homologous pixel luminance in subsequent frames and is an indicator denoting movement. The computation is repeated also with reference to a certain number of further blocks obtained by displacing the homologous block in the previous frame within a certain neighbourhood by steps of a desired number of pixels. This allows detecting picture movement and movement direction. For each block in the current frame, the minimum temporal information value is selected among the computed ones, that is the one providing the best movement evaluation, and blocks are removed whose absolute temporal information value is less than a further threshold. This is the condition allowing movements represented by camera displacements to be recognised and neglected: those movements are generally slow translations, characterised therefore by limited variations. Also the neighbourhood size, the step amplitude and the temporal information threshold are parameters that can be set by the operator.

Once having detected thereby the blocks affected by the actual movement, they are ordered by decreasing temporal information: if a value m has been set for the number of blocks to be distorted, ordering them by decreasing temporal information will allow applying the distortion to those with greater temporal information, that is those with greater displacements, if it is not possible to apply the distortion to all blocks. In fact, in a given frame, a certain number $n_0$ of blocks can be distorted, $n_0$ being the difference between the number m of blocks for which distortion is required and the number $m_p$ of blocks already distorted to create the persistence effect with respect to previous frames: therefore, if the number of blocks detected through the temporal information analysis does not exceed $n_0$, distortion is applied to all blocks, otherwise it is applied only to the first $n_0$ blocks.

For the actual distortion application, finally, for every block to be distorted, the average luminance is computed within the block and the luminance for each pixel is replaced by a weighed mean between the average luminance and the actual luminance of the examined pixel; the weighed mean is obtained by applying to the two values respective weights which are algorithm parameters set by the operator. Advantageously, the weights to be assigned to the pixel luminance and to average block luminance are the 1-complement of each other, and therefore it is enough to store the values for a single weighing coefficient. Suitable values for a weighing coefficient are in the range between 0.2 and 0.6. The value obtained through the weighed mean is then still modified by adding a random term with null mean value and with a maximum value that is a further algorithm parameter, set by the operator.

Figure 2A:
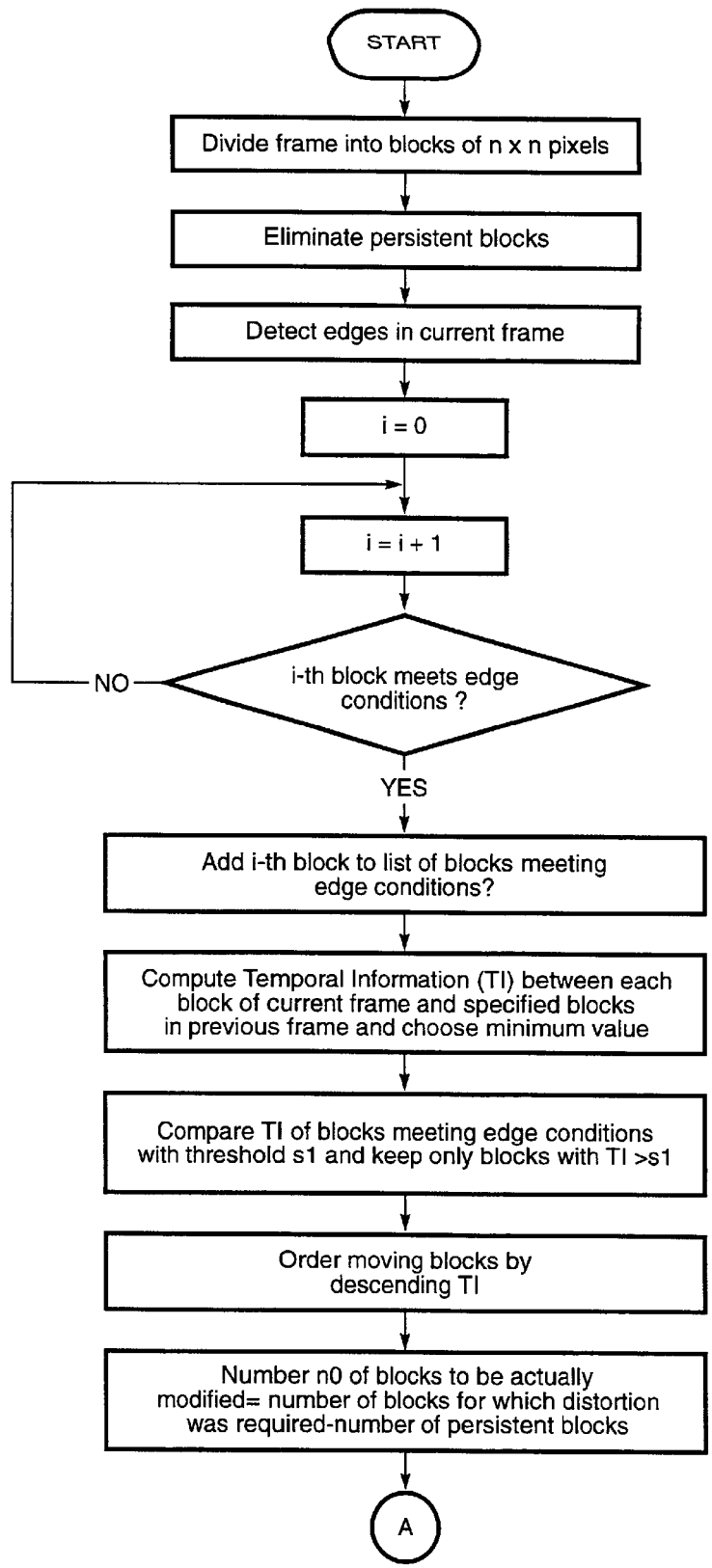
Figure 2B:
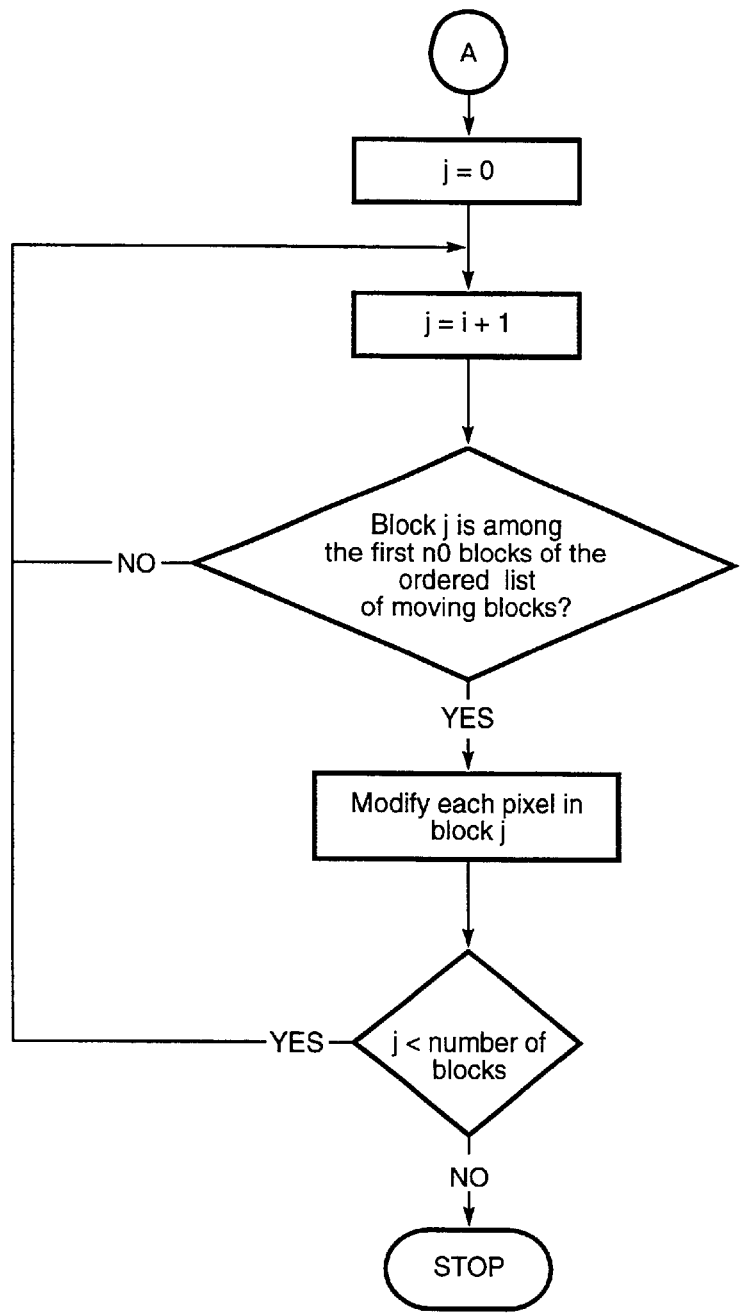

FIGS. 2A, 2B schematically show the described algorithm. In these Figures, i, j are the indexes for the examined blocks. Given what is stated above, the diagram is self-explaining.

As regards edge busyness distortion, when initialising the test, a set of echoes that can be added to the picture itself are stored for each picture. Each echo will be identified by its co-ordinates, that is by the vertical and horizontal distance (expressed in number of pixels) from the picture edge, by an intensity (gain or attenuation) and by a persistence time. The operator can establish in the initialisation phase the number of echoes to be applied. In case multiple echoes are applied, their persistence periods will be established in order to avoid the simultaneous change of more than one echo in a given frame. In a preferred embodiment, a echo with given co-ordinates, randomly chosen within the preselected set, is applied together with the symmetrical one with respect to the picture (that is, if the selected echo has co-ordinates xk, yk, the echo having co-ordinates −xk, −yk is also applied). The two echoes of the pair obviously have the same persistence. At the end of the persistence period for the or a pair of echoes, the co-ordinates for the or a new pair will be also randomly selected.

Figure 3A:
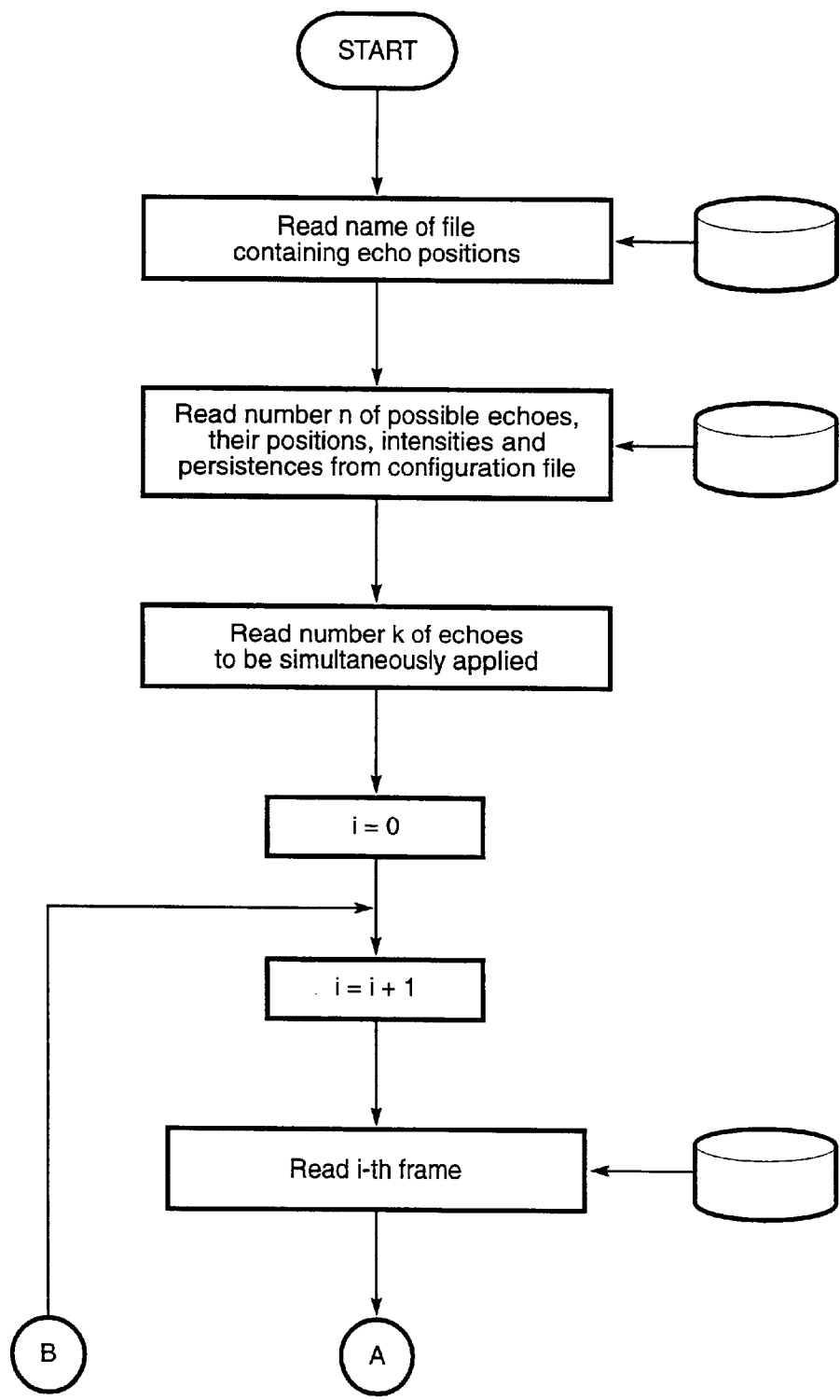
Figure 3B:
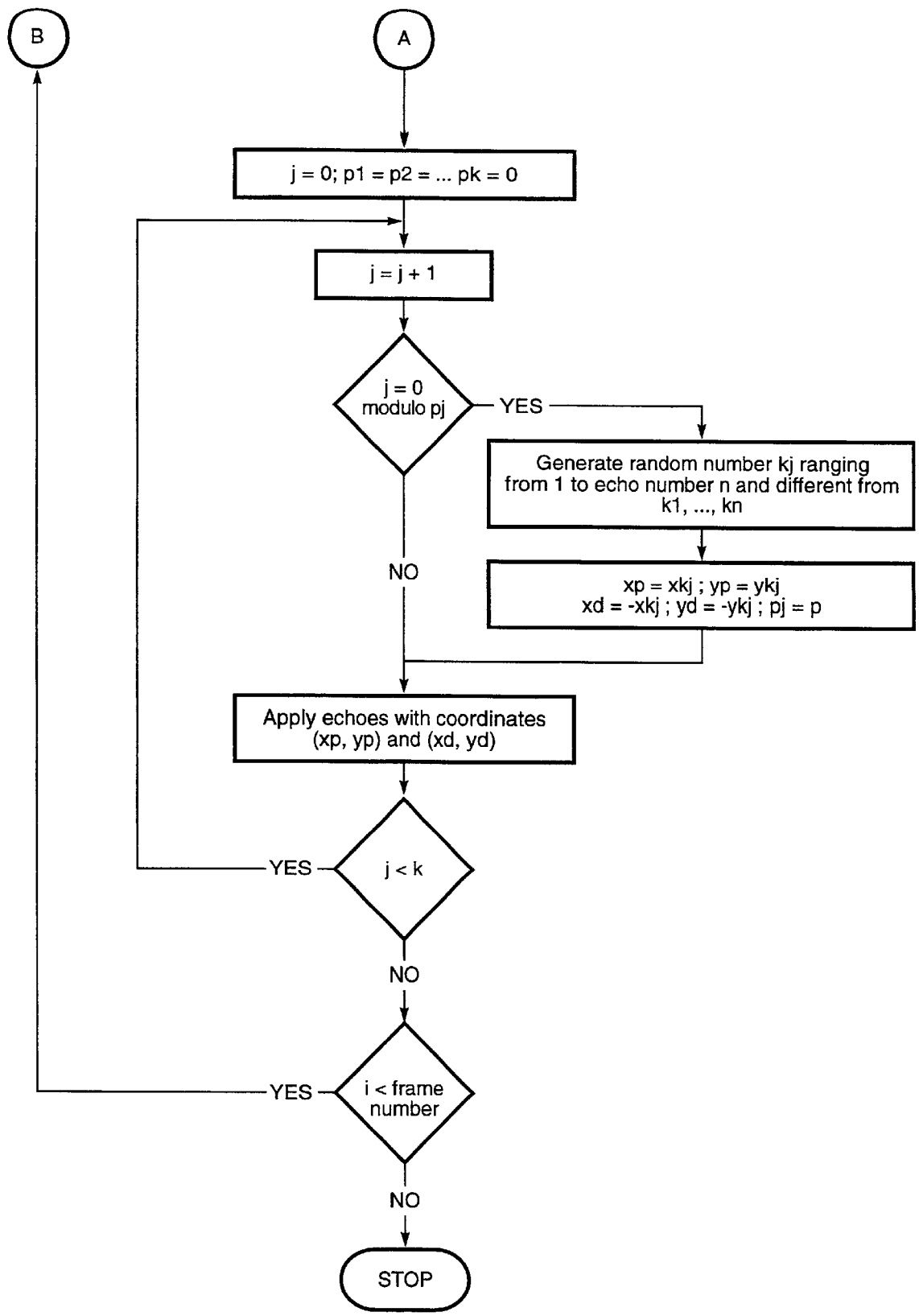

The above-specified algorithm is shown in detail in the flow chart in FIGS. 3A and 3B. Therein, is the frame index, j the replica index, p1 ... pk are the persistence times for the different replicas; k1 ... kn are the indexes for already used replicas. Given what is stated above, the diagram is self-explaining.

The novelty features provided by the invention as regards blockiness distortion are as follows: a) the invention allows distinguishing between subject movement and camera movement, thereby avoiding distortion introduction in the areas characterised by a rigid and slow translation, in which the camera movement is recognised; b) in order to apply the distortion, after the camera movement has been compensated, not all blocks close to the edges are taken into account, but a finer choice is carried out, by considering two groups of blocks, the first comprising blocks with a number of edge pixels included within an upper range and the second composed of blocks with a number of edge pixels included within a lower range; c) when actually applying the distortion, the weights assigned to original pixel luminance and to average block luminance are variable and mutually different.

As regards edge busyness distortion, an arbitrary number of echoes are added and they can be placed in any position, randomly occur and can have variable persistence. Tests carried out have proven that these innovations really make the introduced distortion better perceivable by a viewer.

A further improvement in perceptibility can be obtained also as regards jerkiness; for this distortion, in addition to reducing frame frequency by replacing a certain number of frames with as many repetitions of the previous frame, in case of interleaved pictures the field alternation can be removed, by replacing for example the odd field with the even one.

Hereinabove, only distortions actually concerned by the invention have been described in detail, without examining their interactions with one another and with other possibly applied distortions. These interactions anyway result from the above mentioned Recommendation, that also provides indications related to the distortion application order and mode when more than one distortion is to be applied.

It is apparent that what is disclosed is provided as a non-limiting example and that variations and modifications can be introduced without departing from the scope of the invention. In particular, even if only distortion application to luminance pixels has been discussed, similar distortion criteria can be used for chrominance.

What is claimed is:

1. Method of introducing reference impairments into digital video pictures, wherein at least a first distortion is introduced into a test picture, said first distortion being represented by a value modification at least of luminance pixels of pixel blocks located next to picture edges and affected by a movement of the picture, and wherein for said modification, in every picture frame:

a) picture edges are identified;

b) areas adjacent to said edges and including said pixel blocks are selected, and blocks potentially distortable are identified among the blocks belonging to said areas through an analysis of movement characteristics;

c) the pixel luminance value for each block to which distortion is actually to be applied is replaced by a value linked to the individual pixel luminance and to the average block luminance;

characterised in that, for said identification of blocks that are potentially distortable, blocks with a number of edge pixels lying within an upper range and blocks with a number of edge pixels lying within a lower range are detected and, for the blocks detected, at every frame an indicator of displacement with respect to a group of corresponding blocks in a previous frame is determined; said displacement indicator is compared with a first threshold, and the distortion is applied only to blocks for which the displacement indicator is not less than said first threshold, to prevent application of distortion to blocks in which movement is only due to displacements of a camera picking up the picture.

2. Method according to claim 1, characterised in that said luminance value modification includes replacing the luminance value for each pixel in a block to be distorted with an average between the original pixel luminance value and an average block luminance value, said values being weighed with respective variable weights selected in a set stored during a method initialisation step.

3. Method according to claim 2, characterised in that the weights for the original pixel luminance value and for the average block luminance value are different and mutually complementary.

4. Method according to claim 1, characterised in that the limits of said upper and lower ranges for the number of edge pixels are chosen within respective ranges stored during a method initialisation step.

5. Method according to claim 1, characterised in that distortion is applied to a maximum number of blocks which is chosen within a value range established during the method initialisation step and, for each distorted block, distortion is made to persist for a number of subsequent frames varying from block to block, said number of frames being also established in said method initialisation step, a block being excluded from further distortion application for the whole persistence period.

6. Method according to claim 1, characterised in that, for the comparison with said first threshold, the minimum displacement indicator is chosen for the current block.

7. Method according to claim 1, characterised in that blocks whose displacement indicator is not less than the threshold and for which the persistence period has not elapsed are ordered by decreasing displacement indicator values and, if the number of these blocks is greater than the difference between the maximum number of blocks set and the number of blocks for which the persistence period of distortion applied in previous frames has not elapsed, distortion is applied to those with higher displacement indicators, in a number equal to said difference.

8. Method according to claim 1, wherein a second distortion is applied, in alternative or in addition to the first distortion, said second distortion being represented by adding pixels that are located at a distance from the picture and can persist for a number of frames, characterised in that in a current frame at least a pair of pixels are introduced, composed of a first pixel whose distance from the picture, both along a vertical picture co-ordinate and along a horizontal picture co-ordinate, is randomly selected within a set of possible horizontal and vertical distances established in said method initialisation step, and of a second pixel, that is the symmetrical pixel to the first one with respect to the picture.

9. Method according to claim 8, characterised in that a single pair of pixels is introduced.

10. Method according to claim 8, characterised in that a plurality of pairs of pixels are introduced, and each of them is made to persist for a number of frames varying from pair to pair and established in said method initialisation step, in such a way that different pairs change in different times.

11. Method according to claim 8, characterised in that, at the end of the persistence period for a pair of pixels, the co-ordinates for a new pair of pixels to be applied to following frames are randomly selected within the same set of horizontal and vertical distances.

12. Method according to claim 8, wherein a third distortion is applied, in alternative or in addition to the first and/or the second distortion, said third distortion being represented by a frame frequency reduction of a test picture obtained by repeating the same frame one or more times, characterised in that, in case said test picture is an interleaved picture, the field alternation is removed, by repeating twice a same field.

13. Apparatus for introducing reference impairments into sequences of digital video pictures, comprising:

first memory means (8) for the temporary storage of subsequent frames of a picture to be distorted and of frames resulting from distortion application;

a processing unit (7) that accesses said first memory means to read picture parts, to identify areas where to introduce one or more of said distortions, to modify said areas as required by the specific distortions, and to write the modified picture to be supplied to display means (6);

second memory means (9) arranged to store operating information necessary to apply the distortions; and a control unit (10) arranged to select operating apparatus modes and values of parameters to be used and to store execution modes and values of parameters being used, characterised in that said processing unit (7) is programmed in order to introduce into a sequence of pictures at least a first distortion, represented by a value modification at least of luminance pixels in a number of pixel blocks located next to picture edges and affected by a movement of the picture, through the following operations:

a) identification of picture edges in every frame;

b) identification of pixel blocks having a number of edges pixels lying within an upper value range and of pixel blocks having a number of edge pixels lying within a lower value range;

c) computation, for each pixel block identified in step b), of the displacement with respect to every block of a pre-set group of pixel blocks in a previous frame, generation of a respective displacement indicator and detection of the minimum displacement indicator for the current block;

d) selection of pixel blocks having a minimum displacement indicator higher than a threshold;

e) ordering of the pixel blocks selected in step d) according to the displacement indicator value;

f) computation of the maximum number of blocks to which frame distortion can be applied;

g) modification of the luminance value for the pixels in a block by replacing the original value with an average between said original value and an average block luminance value, said values being weighed with respective weighing factors, and addition to said average of a random value selected within a range that can be pre-set by means of said control unit (10), the modification operations being carried out for all blocks selected in step d), if their number does not exceed said maximum number, or only for those with greater displacement indicators, in a number equal to said maximum number, if the number of blocks selected in step d) exceeds said maximum number.

14. Apparatus according to claim 13, characterised in that said processing unit (7) is programmed in order to introduce into the sequence of pictures, in alternative or in addition to the first distortion, also a second distortion, represented by random addition of pixels that are spaced from the picture edge by a horizontal and vertical distance selected within a pre-established set of possible distances and that can persist for a period selected within a pre-established set of possible persistence periods, the added pixels comprising at least a pair of pixels whose distances from the picture have the same absolute values and opposite sign.

15. Apparatus according to claim 14, characterised in that said processing unit (7) is programmed in order to introduce into the sequence of pictures, in alternative or in addition to one or both of said first and second distortions, also a third distortion represented by a reduction of the frame frequency, and to suppress, when applying said third distortion to interleaved images, the field alternation, by twice replicating a same field.

* * * * *